March 24, 1959     E. UHLAND     2,878,738
PRESELECTOR FOR OPTICAL DIAPHRAGMS

Filed May 4, 1956

Open close diaphragm

*Inventor:*
ERICH UHLAND

By
AGENT

United States Patent Office 2,878,738
Patented Mar. 24, 1959

2,878,738

PRESELECTOR FOR OPTICAL DIAPHRAGMS

Erich Uhland, Kreuznach, Germany, assignor to Jos. Schneider & Co., Kreuznach, Germany, a corporation of Germany Application May 4, 1956, Serial No. 582,876

Claims priority, application Germany May 5, 1955

4 Claims. (Cl. 95—64)

My present invention relates to a preselector for the aperture of an iris diaphragm in photographic cameras and the like.

Various arrangements have been proposed heretofore for pre-selecting a desired operating position of a diaphragm in which the latter will be arrested upon the manual or automatic return of its control element from an extreme position wherein the diaphragm is wide open for focusing purposes. Prior systems of this type, however, have for the most part been cumbersome, intricate and costly to manufacture or difficult of operation and unreliable in performance.

The principal object of this invention is to provide an arrangement of the character described which is of extremely simple construction, easy to handle and dependable in its operation.

According to a feature of my invention, there are provided in combination a stationary member having a plurality of notches and, next to it, a preselector member displaceable with respect thereto and provided with a recess adapted to be selectively aligned with any of these notches; a movable diaphragm-control member carries an indexing element so urged against the indented faces of the stationary member and of the adjacent preselector member as to enter the one notch of the former which is aligned with the recess of the latter, thereby arresting the diaphragm-control member in its movement from wide-open to nearly closed diaphragm position. The notches and the recess are preferably of sawtooth shape so as to be effective only in the direction of diaphragm closure; in that event the indexing element may be a simple leaf spring bearing at all times upon the two indented faces referred to.

Figure 1:
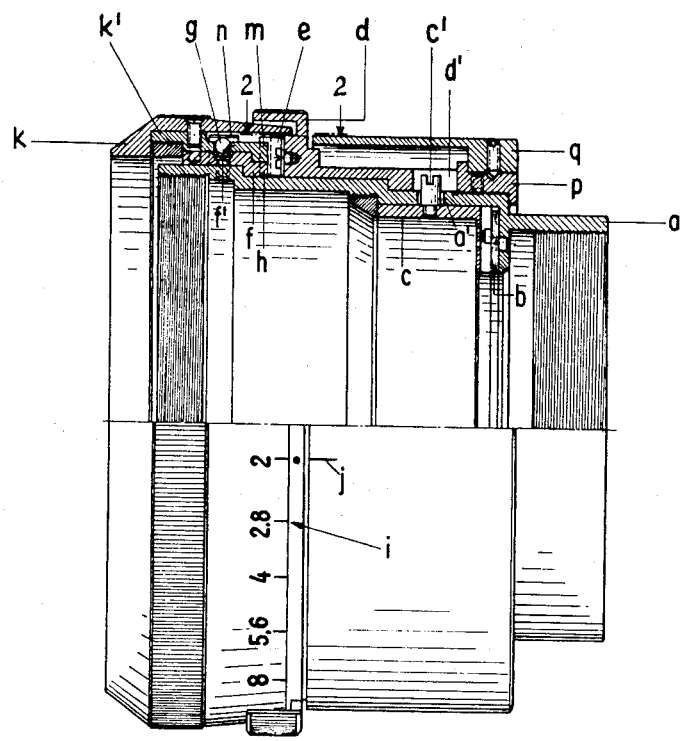
Figure 2:
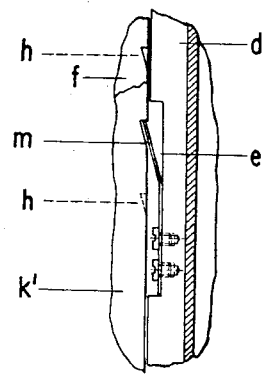

The invention will be described in greater detail with reference to the accompanying drawing in which:

Fig. 1 is a side-elevational view, partly in section, of part of a photographic objective embodying the invention; and Fig. 2 is an enlarged detail view taken on the line 2—2 of Fig. 1.

The objective shown in the drawing comprises a lens barrel $a$ which for purposes of the present invention may be regarded as stationary; a diaphragm $b$, comprising the usual iris leaves, is mounted in this barrel so as to have its opening adjustable by a control ring $c$ linked via a screw $c'$ with an externally operable setting ring $d$. Screw $c'$ passes through an arcuate slot $a'$ in lens barrel $a$ and is received in a narrow coupling slot $d'$ formed in ring $d$.

Secured to ring $d$ is a leaf spring $e$ whose extremity slides along the right-hand face of an indexing ring $f$ fixedly mounted on lens barrel $a$. This face of ring $f$ is provided with a plurality of sawthooth-shaped notches $h$ whose positions correspond to those of the graduations of a diaphragm scale $i$ on a rotatable selector ring $k$; a mark $j$ on a stationary annular part $q$, secured to lens barrel $a$ through the intermediary of a retaining ring $p$, co-operates with the scale $i$.

Selector ring $k$ is provided with a skirt $k'$ which overlies the indexing ring $f$ and is adapted to be yieldably retained in various angular positions relative thereto by suitable detent means here shown as a ball check $g$; the latter is urged by a spring $n$ into engagement with one of several angularly spaced depressions $f'$ (only one shown) provided on ring $f$. Skirt $k'$ has its right-hand face aligned with that of ring $f$ and provided with a single notch $m$ which is similar in shape to the notches $h$ and registers with different ones of these notches in the various angular positions of selector ring $k$.

In the operation of the diaphragm-control system shown in the drawing, selector ring $k$ is first rotated to select a desired operating position for the iris diaphragm $b$ as indicated by the arrows in Fig. 2; this displaces the scale $i$ with respect to mark $j$ so that the preselected diaphragm opening may be read directly thereon. When the user focuses the camera, he rotates setting ring $d$ in the direction indicated by the left-hand arrow until it reaches an extreme position corresponding to wide-open diaphragm. Ring $d$ may be retained in this position against the force of a restoring spring by a suitable detent mechanism, not shown, e.g. as disclosed in U.S. Patent No. 2,612,093 granted September 30, 1952 to K. H. Schutz and assigned to the owner of the present application. When the detent is released, ring $d$ is rotated by its restoring spring in the direction indicated by the right-hand arrow until spring $e$ snaps into the aligned notches $h$ and $m$, thus preventing further closing movement of the diaphragm. It will be understood that the last-mentioned movement of ring $d$ may also be brought about by direct manual rotation and that in some instances the aforesaid detent mechanism may be dispensed with.

Various modifications of the specific arrangement disclosed herein will be apparent to persons skilled in the art and are intended to be embraced within the scope of the invention as defined in the appended claims.

I claim:

1. In a photographic objective, in combination, a lens barrel provided with a diaphragm having a variable aperture and an arrangement for the preselection of an operating position of said diaphragm, said arrangement comprising a stationary member having a face provided with a plurality of first indentations, a preselector member adjacent said stationary member having a face aligned with that of the latter and provided with a second indentation, the indentations on said faces being open toward one another and merging substantially into a single recess in a relatively aligned position, said preselector member being displaceable with respect to said stationary member in a manner bringing said second indentation into register with any one of said first indentations, a diaphragm control member movable with respect to said stationary and preselector members for varying the aperture of said diaphragm, detent means for yieldably maintaining said stationary and preselector members in any position in which said first and second indentations are in register, a resilient indexing element operatively coupled with said diaphragm-control member and urged toward engagement with any one of said first indentations aligned with said second indentation, said indexing element being so shaped and positioned with respect to said indentations as to prevent the movement of said preselector member in a predetermined direction, upon its engagement with the recess formed by said aligned indentations, while permitting free movement of said preselector member in the opposite direction, said preselector member being provided with an unindented portion preventing said indexing member from engaging any of said first indentations not aligned with said second indentation, and means associated with said preselector member for indicating the diaphragm openings corresponding to the positions of said preselector member.

2. The combination according to claim 1, wherein said first and second indentations are sawtooth-shaped notches.

3. The combination according to claim 1, wherein said indexing element comprises a leaf spring having one extremity secured to said diaphragm-control member and having a free other extremity engageable with said indentations.

4. The combination according to claim 1, wherein said detent means comprises a ball check on said preselector member.

References Cited in the file of this patent

UNITED STATES PATENTS

| | | |
|---|---|---|
| 2,222,298 | Nerwin | Nov. 19, 1940 |
| 2,527,243 | Cronholm | Oct. 24, 1950 |
| 2,612,093 | Schutz | Sept. 30, 1952 |

FOREIGN PATENTS

| | | |
|---|---|---|
| 108,458 | Great Britain | Jan. 17, 1918 |
| 957,342 | France | Aug. 22, 1949 |